United States Patent [19]

Villagran et al.

[11] Patent Number: 5,490,999
[45] Date of Patent: Feb. 13, 1996

[54] PROCESS FOR MAKING REDUCED FAT NUT SPREADS

[75] Inventors: Francisco V. Villagran, West Chester; Gregory M. McCabe, Cincinnati; Vincent Y.-L. Wong, Hamilton, all of Ohio

[73] Assignee: The Procter & Gamble Company, Cincinnati, Ohio

[21] Appl. No.: 222,770

[22] Filed: Apr. 4, 1994

[51] Int. Cl.$^6$ ..................................................... A23L 1/38
[52] U.S. Cl. ........................... 426/633; 426/518; 426/519
[58] Field of Search ................................ 426/633, 518, 426/519

[56] References Cited

U.S. PATENT DOCUMENTS

| | | | |
|---|---|---|---|
| 3,597,230 | 8/1971 | Colby et al. | 99/122 |
| 3,600,186 | 8/1971 | Mattson et al. | 99/1 |
| 3,619,207 | 11/1971 | Dzurik et al. | 99/128 |
| 4,005,196 | 1/1977 | Jandacek et al. | 424/180 |
| 4,341,814 | 7/1982 | McCoy | 426/603 |
| 4,863,753 | 9/1989 | Hunter et al. | 426/633 |
| 5,079,027 | 1/1992 | Wong et al. | 426/633 |
| 5,230,919 | 7/1993 | Walling et al. | 426/633 |

OTHER PUBLICATIONS

U.S. Ser. No. 08/222,770, date: Apr. 4, 1994, Wong et al., filing date: May 17, 1994.
U.S. Ser. No. 08/136,524, date: Oct. 14, 1993, Wong et al., filing date: Oct. 14, 1993.
Chemical Engineers' Handbook, J. H. Perry, ed. 1950, pp. 1167–1168.

*Primary Examiner*—Helen Pratt
*Attorney, Agent, or Firm*—Rose Ann Dabek; Tara M. Rosnell; Eric W. Guttag

[57] ABSTRACT

A process for preparing a high protein or low fat nut spread having desirable fluidity, texture and flavor. The process comprises as a first step depositing a nut paste in a mixing tank. Next, the solid ingredients are mixed sequentially with the paste with the proteins being added last. The Casson plastic viscosity of the mixture is adjusted to about 30 poise or less. This mixture is then pumped through a homogenizer and a colloid mill or series of colloid mills. Nut spreads having a bimodal particle size distribution such that at least 50% of the solids in the nut spread have a particle size of less than 18 microns and 90% of the solids in the nut spread have a particle size of less than 60 microns, and further having a Casson plastic viscosity of from about 8 to about 17 poise and a yield value of less than about 300 dynes per square centimeter are produced according to this process.

10 Claims, No Drawings

PROCESS FOR MAKING REDUCED FAT NUT SPREADS

FIELD OF THE INVENTION

The present invention relates to a sequential process for adding solids to peanut paste that results in a fluid, nongritty low fat nut spread having superior peanut flavor. Whole fat nuts and other additives can be used in the spread.

BACKGROUND OF THE INVENTION

Conventional peanut and other nut butters or spreads consist of a mixture of solid nut particles, liquid oil, flavorants, e.g., a sweetener such as sugar, high fructose corn syrup or honey, and salt, and a stabilizer. Peanut butters typically contain about 50% oil and about 50% solids and have good texture, spreadability and flavor. Other nuts have up to 75% oil and butters made from them have higher oil levels than peanut butter.

High protein and/or reduced fat nut spreads are typically prepared by increasing the level of protein-containing solids in the final product relative to the level of oil. Reduced fat peanut spreads, for example, typically have from about 58% to about 75% solids and from about 25% to about 42% oil.

Unfortunately, increasing the solids level relative to the oil level can have deleterious affects on the quality of the nut spread. For example, higher solids levels can increase the viscosity of the spread making it undesirably stiff (e.g., nonfluid). Spreadability or fluidity is highly sensitive to the oil content of the nut spread; the lower the oil content, the harder the product is to spread. Most nut butters have a biomodal particle size distribution. The addition of non-nut solids, e.g., starches or proteins, reduces the fluidity of the nut spread and can create a polymodal particle size distribution in the finished nut spread (reduced fat nut spreads desirably have a monomodal or bimodal particle size distribution). Solid particles above 20 microns in size create a grittiness sensation in the mouth. Lastly, adding solids which are not from nuts dilutes the nut or peanut flavor.

Past attempts to make nut spreads with desirable fluidity, smooth texture and good flavor but which contain a high level of solids (e.g., greater than about 58%) have not been wholly successful. Efforts to reduce grittiness have resulted in a high viscosity spread. Attempts to reduce viscosity have resulted in nut spreads with less flavor compared to full fat peanut butters. A process taught by Wong et at. utilized a roll milling operation to prepare defatted peanut solids for use in a low fat peanut spread. (See U.S. Pat. No. 5,079,027 issued Jan. 7, 1992.) Another process taught by Walling et al utilized extrusion roasting or a combination of roll milling and high shear mixing to prepare defatted peanut solids to be combined with undefatted peanuts in the preparation of a low fat peanut spread. (See U.S. Pat. No. 5,230,919 issued Jul. 27, 1993.) The use of defatted peanuts and intense lo processing conditions resulted in peanut spreads with inferior flavor compared to full fat peanut butters. Moreover, the roll milling and extrusion roasting processes taught by Wong et al. and Walling et al. are relatively capital intensive for a peanut manufacturing operation.

When whole fat nut pieces or fat containing chips (e.g., chocolate chips) or flavors are added to the low fat nut spread, the overall fat content is increased. When these high fat materials are added for flavor, texture or variety, the fat content of the nut spread needs to be lower than 35% fat to continue to deliver a total low fat content.

A key to making a low fat spread is controlling the viscosity of the butter during processing. If the mixture gets excessively viscous, it cannot be pumped easily and when the mixture is milled excess work is required. The spread can overheat and burn. It is therefore an object of this invention to provide a process for making a nut spread that controls the viscosity during processing by controlling the order of addition of the solid ingredients, particularly by limiting the work applied to the protein mixture.

It is therefore an object of the present invention to provide a process for preparing high protein and/or reduced fat nut spreads which have desirable texture (e.g., are not gritty) and fluidity and which have a nut flavor comparable to that of conventional full fat nut butters and which are low enough in fat to accommodate full fat nut chunks and other fat containing chips, particles and flavors.

SUMMARY OF THE INVENTION

The present invention relates to a process for preparing a high protein or low fat nut spread having desirable fluidity, texture and flavor by controlling the order of addition of the ingredients. The process comprises as a first step depositing a nut paste in a mixing tank connected to a homogenizer and colloidal mill in a mode that recycles the nut paste. The Casson plastic viscosity of the mixture is adjusted to about 30 poise or less by pumping this mixture through a homogenizer and a colloid mill or series of colloid mills. The viscosity is controlled by adjusting the recycle rate and the feed rate of the solids and the order of addition of the solids. The non-protein solids are added first; the protein solids are metered in last. The recycle continues until all solids are added and the particle size distribution of the nut paste is such that at least 50% of the solids in the nut spread have a particle size of less than 18 microns and 90% of the solids in the nut spread have a particle size of less than 60 microns, a Casson plastic viscosity of from about 8 to about 20 poise and a Casson yield value of less than about 300 dynes per square centimeter.

The reduced fat nut spread is then passed through a scraped surface heat exchanger or freezer to cool the product, and a nut spread is made This base spread is low enough in fat to accommodate addition of full fat nuts or high fat chips. The chunks or pieces of full fat nuts are added. The base spread has a fat content of 34% or less and the final product with the chunks in it has a fat content of less than 40%.

DETAILED DESCRIPTION OF THE INVENTION

The term "nut spread" as used herein means a spreadable food product made from nut solids and oil. Nut spreads typically contain from about 58% to about 75% solids and from about 25% to about 42% oil or fat. The remainder of the nut spread comprises additives such as sweeteners, stabilizers, flavoring agents, proteins and non-nutritive bulking agents such as starches, gums, polydextrose. The process of the present invention is particularly suitable for preparing low fat (about 22% to 35% total fat by weight) peanut spreads of acceptable fluidity, texture and flavor.

The materials used in the process of the present invention, the steps of the process, and products prepared according to the process are described in detail as follows:

I. Process Materials

A. Nut paste

Nut paste, preferably peanut paste, is the starting material. The paste is ground nuts and consists of nut solids, including protein and the nut oil or fat. While this invention will be generally described in terms of peanuts and peanut paste, it should be readily apparent that other materials such as almonds, pecans, walnuts, cashews, filberts, macadamia nuts, brazilians, sunflower seeds, sesame seeds, pumpkin seeds and soybeans could be used to form the nut paste. The term "nut" as used herein encompasses these nuts and seeds. Mixtures of these nuts and oil seeds can also be used.

The nut paste is formed by conventional methods. For example, the nuts can be roasted, blanched and then ground in a conventional grinder or mill such as a Bauer mill to produce a nut paste of pumpable consistency. The nut paste may optionally be defatted or the particle size of the nut solids of the nut paste may be reduced by a roll mill or extruder roasting (see, for example Wong et al.; U.S. Pat. No. 5,097,027 Issued Jan. 7, 1992).

The nut paste will typically comprise from about 50% to about 85% of the nut spread, and preferably, from about 50% to about 75% of the nut spread. More preferably, the nut paste comprises from about 50% to about 65% of the nut spread. Nut spreads containing these levels of nut paste will generally comprise from about 25% to about 42%, preferably from about 30% to about 40%, more preferably from about 30% to about 35% total fat.

B. Solid ingredients

In order to lower the fat content and maintain protein levels in the spread, non-fat containing solids are used. These include corn syrup solids, maltodextrin, dextrose, polydextrose, fiber, mono- and disaccharides, starches (e.g., corn, potato, tapioca wheat) and flours (e.g., wheat, rye, pea); protein supplements such as additional peanut solids, soy flour, soy concentrate, soy isolate, casein, egg whites, and protein from other animal or vegetable sources; or a combination of the above. The sugars, honey or molasses used to sweeten or flavor the nut spread are included in the level of solids. Typically 3% to 10% sugar or molasses is used for flavoring.

The solid ingredients typically comprise from about 15% to about 50% of the nut spread. Preferably, the solid ingredients comprise from about 25% to about 45% of the nut spread. More preferably, the solid ingredients comprise from about 35% to about 45% of the nut spread. The level of protein solids added depends on the protein level required in the final product.

C. Other Optional Ingredients

In addition to the nut paste and the solid ingredients described hereinabove, the process of the present invention may optionally utilize other ingredients. For example, low calorie oils and zero calorie oils such as sucrose polyesters of long chain fatty acids (olestra) and other polyol polyesters of fatty acids can be used (see for example U.S. Pat. No. 3,600,186 to Mattson, et al. and U.S. Pat. No. 4,005,196 to Jandacek). Mixed triglycerides made from medium and long chain saturated and/or unsaturated fatty acids can also be used herein. An oil which contains at least 10% medium chain triglycerides can also be used. Medium chain triglycerides contain saturated fatty acids having from six to twelve carbon atoms. Reduced calorie peanut butters containing medium chain triglycerides are described in U.S. Pat. No. 4,863,753 (Hunter, et al., 1989).

The nut spread prepared according to the process of the present invention may also optionally contain a stabilizer. The stabilizer can be any of the known peanut butter stabilizers, for example, hydrogenated rapeseed oil, or other hydrogenated triglycerides having a high proportion of $C_{20}$ and $C_{22}$ fatty acids. (See for example, U.S. Pat. No. 3,597,230 and U.S. Pat. No. 3,192,102.) Stabilizers are usually triglycerides which are solid at room temperature. They solidify in the nut butter in specific crystalline states and keep the oil from separating. These materials can be mixed with a second hydrogenated oil having an iodine value of less than 8, for example hydrogenated palm oil, canola oil, soybean oil, cottonseed oil, coconut oil, and similar materials. This stabilizer can also be mixed with lower melting fat fractions as, for example, the peanut butter stabilizer composition disclosed in U.S. Pat. No. 4,341,814 (1982).

In addition to the stabilizer, or in lieu thereof, an emulsifier can be used in the process of the present invention. The emulsifier can be any food compatible emulsifier such as mono- and di-glycerides, lecithin, sucrose monoesters, polyglycerol esters, sorbitan esters, polyethoxylated glycerols and mixtures thereof. Up to about 3% and, preferably, from 1% to 3%, stabilizer or emulsifier is used.

The process described herein can also optionally utilize flavorants. "Flavorants," as the term is used herein, are agents which contribute to or enhance the flavor of the nut butter. These include sweeteners, flavor enhancers, artificial sweeteners, natural and artificial flavors, flavored or candied bits, nut chunks and other additives which contribute to the flavor of the spread. Sweeteners are selected from the group consisting of sugars, sugar mixtures, artificial sweeteners and other naturally sweet materials. Sugars include, for example, sucrose, fructose, dextrose, honey, molasses, high fructose corn syrup, lactose, maltose, and maltose syrups. Preferably, the sweetener has a sweetness intensity about that of sucrose or fructose. Sweeteners are generally added at a level of 0% to about 10%; preferably from about 1% to about 6%.

Artificial sweeteners such as aspartame, acesulfam, saccharine, cyclamate, and glycyrrhizin can also be used. The amount of artificial sweetener used would be that effective to produce the sweetness that is desired; and would be about the equivalent of the addition of from about 1% to 7% of sucrose.

Flavor enhancers including salt or salt substitutes such as potassium chloride, sodium chloride/potassium chloride mixtures, and seasoned salts can also be used. The level of flavor enhancer used is a matter of the desired taste level, but usually is from about 0.1% to about 2%. Other flavorants include natural or artificial peanut flavors, roasted flavors, and praline/caramel flavors, walnut flavors, almond flavors and flavor compositions.

Nut chunks, and other flavored additives which can be mixed with the peanut spread. These additives include chocolate chips or bits or other flavored bits, e.g. butterscotch and peanuts, jellies, (either low calorie jellies or regular jelly or preserves), and praline nuts or other candies, coconut, cereals and grains, such as toasted oatmeal. These additives are usually added at a level of from about 1% to about 20% by weight. Nut chunks and flavored bits can contain fats and oils. Therefore, the addition of these materials can affect the fat content and the calorie level of the nut spread. The nut chunks can be defatted nuts to which flavored oils or low calorie oils have been added. Nuts which have had substantially all the oil removed should be coated or treated to prevent them from absorbing oil from the base spread.

II. Process steps

First nuts or peanut paste is added to a mixing tank. Next, corn syrup solids and sugars or flavorants are added. The viscosity of peanut paste mixture in the mixing tank increases as solids are added. To provide a fluid peanut spread, it is critical that the mixture have a viscosity of 30 poise or less, preferably 25 poise or less and more preferably 20 poise or less at this point in the process. This critical viscosity for the mixture is achieved by controlling the sequence and the rate at which the solid ingredients are added and by using a recycling product stream wherein the paste mixture is passed through a homogenizer and through a colloid mill or series of colloid mills and returned to the mix tank. It is essential that the protein solids are added only after all other solids are added. The mixing, homogenizing and milling causes the temperature of the peanut paste to rise. In fact, it is preferable to install coolers in the process. These can be added after the homogenizer and after the colloid mill. The colloid mill can be jacketed with recirculating cold water to cool the paste down. Cooling the mixture to below 200° F. (93° C.) prevents the development of burnt off-flavors in the spread.

The heat generated in the mixing can affect the texture of the protein, thereby affecting the final product taste and viscosity. This is one reason for adding it last. It is subjected to less work input and there is less free oil for it to absorb.

The solids are metered into the mix tank so as to maintain a relatively constant viscosity. The homogenizer reduces the particles to a particle size distribution that allows for a lower viscosity state. The colloid mill provides mixing energy for distributing the solid and fat which then lowers the mix viscosity. The rate of the metering of the solid is controlled by the viscosity of the mixture in the mixing tank. The nut spreads made by this process have a bimodal particle distribution such that at least 50% of the solids in the nut spread have a particle size of less than 18 microns and at least 90% of the solids in the nut spread have a particle size of less than about 60 microns. Nut spreads prepared according to the process of the present invention will further have a Casson plastic viscosity of from about 8 to about 20 poise and a Casson yield value of less than about 300 dynes/cm2. The process of the present invention may be a batch process or a semi-continuous, process.

Each of the basic steps of the process of the present invention is described in detail as follows:

A peanut paste is deposited into a mixing tank such as a Hamilton kettle, connected in a recycle loop with a homogenizer and a colloid mill.

A. Mixing the solid ingredients with the peanut paste and adjusting the Casson plastic viscosity of the mixture to about 30 poise or less The solid ingredients are added to the mixing tank containing the peanut paste. The solid ingredients are added gradually The flavors, sugars and bulking agents such as flours, starches, corn syrup solids and polydextrose are added first. The protein containing solids are added after these materials are completely dispersed in the paste. As the solid ingredients are added to the peanut paste, the viscosity of the mixture increases.

The solids are typically added gradually over a period of time typically ranging from about 25 to about 90 minutes, preferably from about 40 to about 70 minutes. The viscosity of the mixture is controlled by the flow or amount of recycled product which has a lower viscosity than the tank mixture, by the solid addition rate, batch size and agitation design. The addition of solids increases the viscosity of the paste in the mixing tank. To lower the viscosity as the solids are added, a portion of the mixture is recycled through a homogenizer and a colloid mill. As a result, the recycle stream viscosity is lower than the tank viscosity.

The flow of the solid ingredients being added to the peanut paste in a batch process, although generally constant, may be speeded up or slowed down as necessary so that the viscosity of the mixture remains somewhat uniform. The solid ingredients are added to the peanut paste sequentially in discrete amounts, as in a multi-batch process.

A portion of the peanut paste and solid mixture is pumped through a homogenizer and a colloid mill or series of colloid mills. This is the recycle stream. The homogenized, colloid milled product stream has lower viscosity than the mixture of peanut paste and solid ingredients already in the tank and can be deposited into the mixing tank to lower the viscosity of the tank mixture.

Typically, the recycled product stream will have a viscosity of less than about 30 poise, more typically less than about 20 poise. Typically at least 50% of the solids in the recycled product stream will have a particle size of less than 18 microns, more typically less than 15 microns, and most typically less than 13 microns, and at least 90% of the solids in the recycled product stream will have a particle size of less than 60 microns, preferably less than 52 microns, more preferably less than 40 microns. The homogenizer, such as the homogenizer described at pages 1167–1168 of Perry's *Chemical Engineers Handbook (3rd Edition)* is used to break down the particle size of the added solids as well as the nuts so that the solids will not impart an undesirable sensation of grittiness to the nut spread upon mastication. The mixture is homogenized by known methods (See, for example, U.S. Pat. No. 3,619,207; Issued Nov. 9, 1971.) The operating conditions of the homogenizer are selected so that after homogenization at least about 50% of the solids have a particle size of less than about 18 microns, preferably less than 15 microns, more preferably less than 13 microns and at least about 90% of the solids have a particle size of less than about 60 microns, preferably less than about 52 microns, more preferably less than about 40 microns. Nut spreads in which at least 90% of the solids have a particle size of less than 60 microns will have a smooth texture (e.g., they will not be gritty). To achieve this reduction is particle size, the homogenizer is typically operated at from about 4000 to about 10,000 psig, preferably from about 5000 to about 8000 psig, more preferably from about 6000 to about 7000 psig. A cell disruption valve can optionally be used to achieve a higher particle size breakdown at lower pressures.

After homogenization, the viscosity of the mixture will be significantly higher due to the increase in particle surface area as a result of particle size reduction. The homogenized mixture is then passed through a colloid mill, to decrease the viscosity of the mixture.

A heat exchanger may optionally be used after the homogenizer to cool the mixture before it reaches the colloid mill. Use of a heat exchanger can prevent flavor degradation and help to increase the efficiency of the colloid mill. The temperature is kept below about 93° C.

The homogenized mixture is pumped through a colloid mill or series of colloid mills to further reduce the viscosity. The operating conditions of the colloid mill are selected so that the viscosity of the nut spread product ranges from about 8 to about 20 poise, preferably from about 8 to about 18 poise, more preferably from about 8 to about 16 poise. Typically, the colloid mill is operated with a wide open gap at about 3600 rpm. It may be necessary to pass the homogenized mixture through more than one colloid mill. Typically, the mixture is passed through the colloid mill from 1 to 6 times, more typically from 1 to 3 times. A heat exchanger can optionally be used between the colloid mills.

After all of the solids have been added to the mixture, the process of making the nut paste is then complete. The nut paste is then passed through a typical conventional peanut butter finishing system. The product is cooled and passed through picker boxes to provide a smooth solid peanut butter or spread. Preferably the temperature is below 50° C., and most preferably between 80° F. and 100° F. (26.5 ° C.–37.5° C.).

The spread can be whipped or aerated (see Walling, et al. U.S. Pat. No. 5,230,919). This aeration lowers the fat level per serving.

The finished nut spread product will have a Casson plastic viscosity of from about 8 to about 20 poise, preferably from about 8 poise to about 18 poise, more preferably from about 8 poise to about 16 poise. The product will further have a yield value of less than about 300 dynes per square centimeter, preferably less than about 280 dynes per square centimeter, more preferably less than about 260 dynes per square centimeter. The particle size distribution of the product is bi-modal. Preferably at least 50% of the solids in the nut spread have a particle size of less than 18 microns, preferably less than 15 microns, most preferably less than 13 microns and at least 90% of the solids have a particle size of less than 60 microns, preferably less than 52 microns, more preferably less than 40 microns. Such a nut spread product is fluid and has desirable texture (e.g., is not gritty) and flavor.

This product has a fat content of less than 35%, and preferably less than 30% depending upon the amount of solids and bulking agents added to the nut paste. To this spread are added whole fat nut chunks to provide a crunchy texture and to add additional nut flavor. The use of defatted nut solids or low fat nuts does not add as much flavor to the product and these low fat nut solids will absorb oil from the nut spread upon standing. Typically nuts contain between 40 and 70% fat. Therefore, the addition of these nut solids will affect the total fat content of the "chunky" peanut spread or nut spread. In addition to whole fat nuts, candied bits or chocolate chips can also be added.

Addition of Nut Particles:

Granules of full fat nuts, chocolate chips or other fat containing candies or bits can be added by conventional means to the peanut spread. Other flavor bits can also be used as noted above.

When nut granules are used, the particles should be larger than 3 mm. Preferably at least 85% of the particles are retained on a Tyler #6 screen (3.25 mm, 0.132 inches opening) and at least 5% are retained on a Tyler #8 screen (2.36 mm, 0.0937 in.). For a peanut spread of 29.7% fat, the effect on fat of adding granules containing 52% fat is illustrated in Table I.

| Peanut Spread (% by weight) | Granules (52% fat) (% by weight) | Total Fat |
|---|---|---|
| 95 | 5 | 30.8 |
| 90 | 10 | 31.9 |
| 85 | 15 | 33.0 |
| 81 | 19 | 33.9 |
| 80 | 20 | 34.1 |

Similar calculations can be made for adding chocolate chips or other fat containing flavorants.

ANALYTICAL TEST METHODS

Particle size distribution, Casson plastic viscosity and Casson yield value are measured by the methods described in Wong, et al., U.S. Pat. No. 5,079,027 beginning at Col. 10, line 42 and continuing through Col. 11, line 55, herein incorporated by reference.

Example I

Example I describes a reduced fat peanut spread prepared by a 400 lb. peanut paste batch process. The ingredients used to prepare this peanut spread are as follows:

| Ingredient | % |
|---|---|
| Peanuts | 53.30 |
| Molasses, Sugar and Salt | 7.80 |
| CBC Stabilizer and Emulsifier | 1.95 |
| Soy Protein Isolate | 5.90 |
| Corn Syrup Solids | 30.90 |
| Vitamins/Minerals | 0.15 |

The emulsifier is a mixture of mono and diglycerides.

The peanuts are roasted at 422° F. (216° C.) to a Hunter L color of 35 and blanched and ground in a Bauer Mill to form a peanut paste. The peanut paste is then deposited into a 100 gallon Hamilton kettle. The molasses, stabilizer, and emulsifier are added to the mixing tank which is held at a constant temperature of 140° F. (60° C.).

Salt, sugar and corn syrup solids are mixed at low speed for about 15 minutes and then loaded into a K-Tron T-35 Twin Screw feeder positioned over the mixing tank.

The solids are then added to the mixing tank at a constant rate over a time period of about 80 minutes (feed rate of 120 lbs/hour). Throughout the time that the solids are being added to the peanut paste in the mixing tank, a portion of the tank mixture is pumped through a Gaulin M-3 Homogenizer at 7,000 psig, into a heat exchanger, and then into a Greerco W-500 H Colloid Mill. At least 50% of the solids in the homogenized, colloid milled product stream have a particle size of less than 12.7 microns and at least 90% of the solids in the product stream have a particle size of less than 54.4 microns. This product stream is deposited into the mixing tank. Heat exchangers are used after the homogenizer and after the colloid mill to maintain the temperature below 200° F. (93° C.).

When all of the corn syrup solids, sugar and salt have been added to the mixing tank containing the peanut paste/solids mixture, the addition of the soy protein solids begins. They are metered in at the same rate as the other ingredients. This mixture is recycled through the homogenizer, heat exchanger and colloid mill for another 90 minutes. The final mixture has a Casson plastic viscosity of 19.1 poise. The vitamins and minerals are then added to the mixture. This paste is then passed through a scraped wall heat exchanger and a picker box with an outlet temperature of between 80° F. and 100° F. The finished nut spread has a Casson plastic viscosity of about 18.0 poise and a yield value of 280 dynes per square centimeter. The particle size distribution is nearly monomodal. At least 50% of the solids in the nut spread have a particles size of less than 11 microns and at least 90% of the solids have a particle size of less than 38.6 microns. This nut spread is fluid and has a smooth (nongritty texture) and desirable flavor. The fat content of the nut spread is 29.7%. Full fat peanut granules are added to the spread using a Cherry Burrell fruit mixer. When 15% peanut granules are used, the final spread has a fat content of 33.0%.

What is claimed is:

1. A process for preparing a high protein, low fat nut spread using a sequential solid addition comprising the steps of:

a) mixing from about 15% to about 50% non-protein solid ingredients with from about 50% to about 85% nut paste wherein the mixture is continuously recycled through a homogenizer and colloid mill to maintain the Casson plastic viscosity at less than 30 poise;

b) mixing protein containing solids with the nut paste mixture prepared in step (a) wherein the mixture is continuously recycled through a homogenizer and colloid mill;

c) when the solids have been added and the resultant nut paste has a bimodal particle size distribution such that at least 50% of the solids have a particle size of less than 18 microns and 90% of the solids have a particle size of less than 60 microns, and a Casson plastic viscosity of from about 8 to about 20 poise, cooling the paste to less than 50° C. to provide a nut spread; and d) adding from about 5% to about 20% nut granules of full fat nuts or high fat chips to the cooled nut paste.

2. A process according to claim 1 wherein the nut spread is a reduced fat nut spread having a fat content of from about 25% to about 35%.

3. A process according to claim 2 wherein the homogenizer is operated at a pressure of from about 4000 to about 8000 psig.

4. A process according to claim 3 wherein the homogenized mixture of peanut paste and solids is maintained at a temperature of less than 104° C. during mixing.

5. A process according to claim 4 wherein the homogenized, colloid milled product recycle stream has a Casson plastic viscosity of less than about 30 poise and wherein 50% of the solids in the product stream have a particle size of less than 18 microns and 90% of the solids in the product stream have a particle size of less than about 60 microns.

6. A process according to claim 4 wherein the mixture comprising peanut paste and solid ingredients is passed through a heat exchanger at below 93° C. before being passed through the colloid mill and before recycling into the mixer.

7. A process according to claim 6 wherein the homogenizer is operated at a pressure of from about 4000 to about 8000 psig.

8. A process according to claim 7 wherein the mixture is passed through a series of from 1 to 6 colloid mills.

9. A process according to claim 8 wherein the mixture is pumped through a series of from 1 to 3 colloid mills before entering the cooling step.

10. A process according to claim 1 wherein at least 85% of said nut particles are 3 mm or larger.

* * * * *